July 28, 1931.  C. C. FARMER  1,816,077
BRAKE CYLINDER DEVICE
Filed March 5, 1929
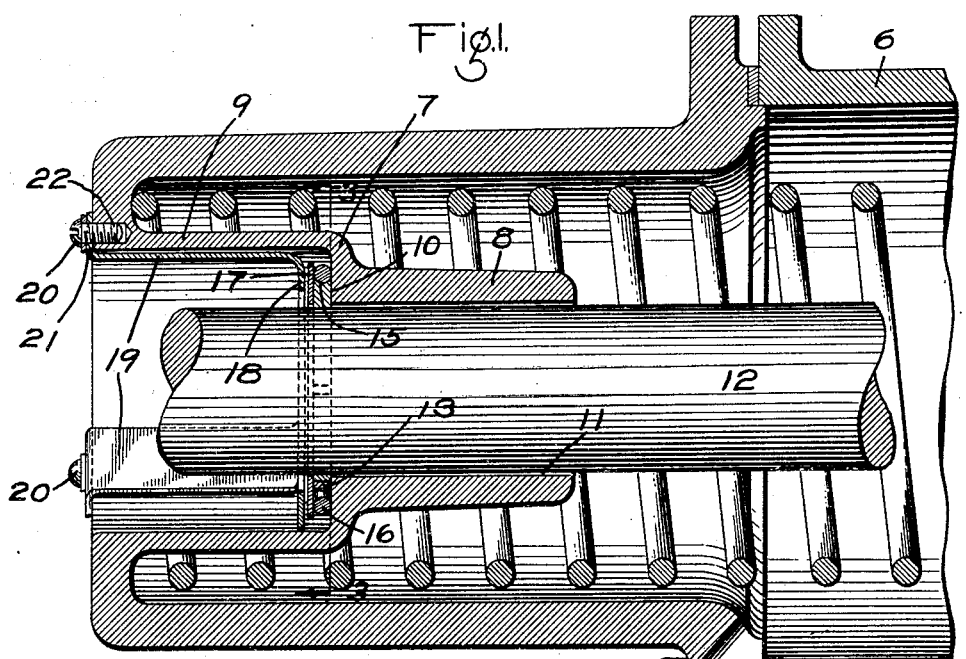
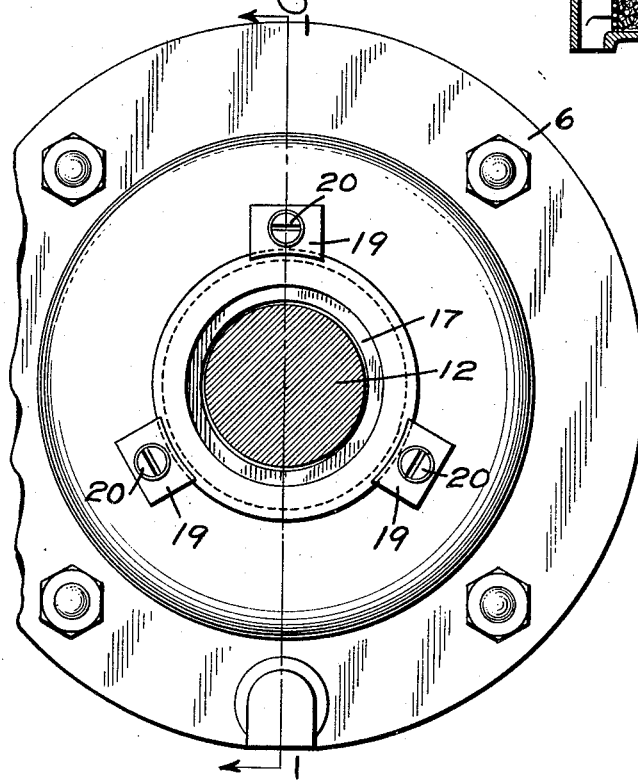
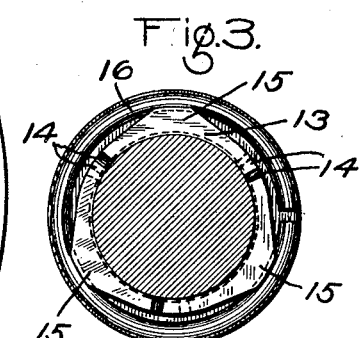
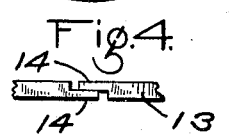
INVENTOR
CLYDE C. FARMER
BY *Wm. W. Cady*
ATTORNEY Patented July 28, 1931

1,816,077

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE CYLINDER DEVICE

Application filed March 5, 1929. Serial No. 344,121.

This invention relates to brake cylinders such as employed with railway brake systems.

An object of the invention is to provide improved means for preventing the entrance of water, snow, dirt and other foreign matter at the non-pressure side of the brake cylinder.

Another object of the invention is to provide a brake cylinder device of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings, Figure 1 is a longitudinal section of a portion of the non-pressure end of a brake cylinder, taken on the line 1—1 of Fig. 2, showing my improvement applied; Fig. 2 is an end elevation of the structure shown in Fig. 1; Fig. 3 is a vertical transverse section taken on the line 3—3 of Fig. 1; and Fig. 4 is a detail fragmentary view, showing one of the segmentary ring joints.

Referring to the drawings, the non-pressure head of the brake cylinder 6 is formed with an inwardly extending tubular boss 7 which may be made with two diameters, the inner portion 8 thereof being of lesser diameter than the outer portion 9, a step or shoulder 10 being formed therebetween.

The portion 8 of the boss 7 is formed with a bore 11 through which the usual piston rod 12 extends.

Encircling the piston rod 12 and disposed within the portion 9 of the boss 7 and bearing against the shoulder 10, is a ring 13, composed of a plurality of similarly formed segments.

Each segment of the ring 13 has a step joint at the opposite ends, as shown in Fig. 4, the tongue 14 of one segment engaging the tongue 14 of the adjacent segment so that radial movement of the segments is permitted, while leakage past the ring is prevented by the engagement of the flat co-operating faces of the tongues.

Intermediate the tongues 14, each segment of the ring 13 is provided with an outwardly extended grooved lug 15, and when the segments have been applied in position, an open ended spring ring 16 is sprung into the grooves of the lugs 15, so that the spring ring 16 yieldingly presses the segments into engagement with the piston rod 12, as shown in Fig. 3.

The segment ring 13 is held in position against longitudinal movement by means of a ring or annulus 17, which may be made from sheet metal or the like.

The ring 17 is free to float at right angles to the piston rod 12 and relative to the non-pressure head of the brake cylinder, and this ring 17 is held in place by means of a retaining member 18.

The retaining member 18 is preferably formed from sheet metal and has a plurality of arms 19 which project outwardly through the open end of the cylinder head, the extremities of the arms being bent at right angles to engage the end face of the cylinder head. The retaining member 18 is detachably secured to the cylinder head by means of screws 20 which are passed through openings 21 in the ends of the arms 19 and enter threaded openings 22 in the end wall of the cylinder head, as shown in Figs. 1 and 2.

The floating ring 17 should be so fitted on the piston rod 12, that when the piston rod wears in the non-pressure head and therefore drops relative to the non-pressure head, the floating ring 17 will drop with the piston rod and prevent the segment ring 13 from opening up a by-pass to the cylinder around the back of the segment ring. Undue wear of the segment ring 13 would also cause such a by-pass to open up and thereby permit dirt and other foreign matter to enter the cylinder. The floating ring 17 therefore tends to permit greater wear of the segment ring 13 by preventing such a by-pass and thereby permits the segment ring 13 to be used longer than would ordinarily be the case.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a brake cylinder having a non-pressure head and a piston rod extending through an opening in said head, a ring disposed in said head and formed of a plurality of segments, means for yieldingly pressing the segments of said ring into engagement with said rod, means formed in the head for preventing longitudinal movement of said segment ring in one direction, a floating ring for preventing longitudinal movement of said segment ring in the other direction, a member for retaining said floating ring in position, said member having a plurality of arms projecting outwardly through the opening of the head, the extremities of said arms being bent to engage the end face of the head, and means for detachably securing the arms of the retaining member to the head.

2. In a device of the class described, the combination with a piston rod and a guide for the piston rod including a tubular boss formed with two diameters having a shoulder therebetween, a segment ring encircling the piston rod and engaging the shoulder, a floating ring for preventing longitudinal movement of said segment ring in a direction away from the shoulder, a member for retaining said floating ring in position, said member having a plurality of arms projecting outwardly through the tubular boss, the extremities of the arms being bent to engage the end of the tubular boss, and means for securing the arms of the retaining member to the tubular boss.

In testimony whereof I have hereunto set my hand, this 18th day of February, 1929.

CLYDE C. FARMER.